(No Model.)
D. C. LANDON.
HOSE REEL.
No. 549,202.  Patented Nov. 5, 1895.
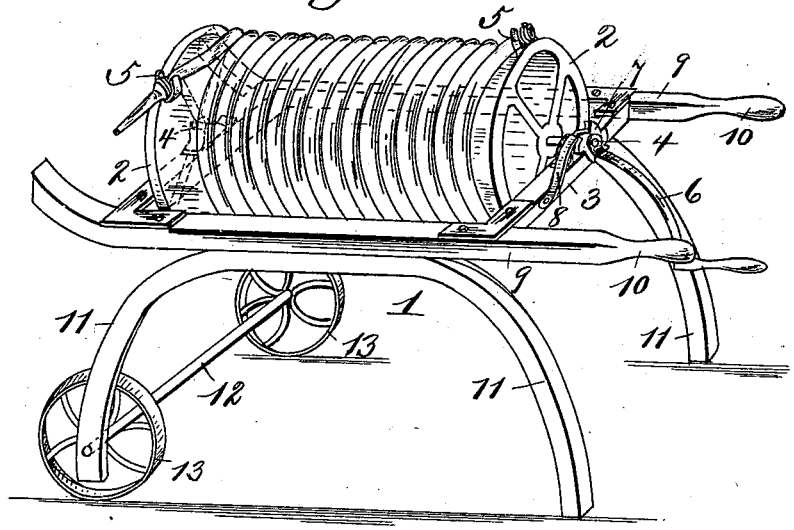
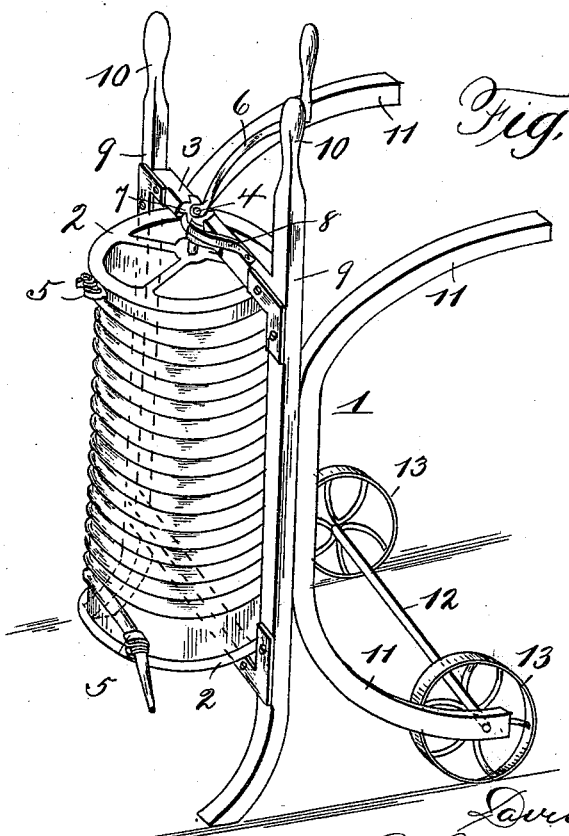
Witnesses:
Inventor
David C. Landon
By Wm. E. Poulter
Attorney

UNITED STATES PATENT OFFICE.

DAVID C. LANDON, OF DUBUQUE, IOWA.

HOSE-REEL.

SPECIFICATION forming part of Letters Patent No. 549,202, dated November 5, 1895.

Application filed August 29, 1895. Serial No. 560,873. (No model.)

*To all whom it may concern:*

Be it known that I, DAVID C. LANDON, a citizen of the United States, residing at Dubuque, in the county of Dubuque and State of Iowa, have invented certain new and useful Improvements in Hose-Reels; and I do declare the following to be a full, clear, and exact description of the invention, such as will enable others skilled in the art to which it appertains to make and use the same.

My invention has relation to hose-reels; and the primary object of my invention is to provide a hose-reel which is adapted to occupy a horizontal position to permit of the ready winding of the hose thereon and adapted to be reversed into a vertical position, whereby the coils of hose will be caused to occupy an approximately horizontal position, whereby all water contained therein will be drained from the hose, thus considerably increasing the durability of the hose.

A further object of my invention is to provide a hose-reel which is of simple, inexpensive, and durable construction; and with the above and other objects in view, all of which will appear hereinafter, my invention consists in the novel construction, arrangement, and combination of parts, as hereinafter fully described, illustrated in the accompanying drawings, and pointed out in the appended claims.

In the drawings, Figure 1 is a perspective view of my hose-reel in its horizontal or winding position. Fig. 2 is a similar view showing the reel in its vertical or draining position.

With the usual construction of hose-reels no provision is made for draining the hose of the water contained therein after the hose has been wound upon the reel, and in consequence, owing to the deleterious action of the water upon the interior of the hose, the latter soon deteriorates and becomes unfit for use.

My invention is intended, primarily, to provide a means whereby the hose may be readily wound upon the reel drum or shaft while the latter occupies a horizontal position, and the device then reversed into a vertical position, whereby the coils of hose will assume a position adapted for the ready draining of the same. This I accomplish partly by a novel arrangement of the rotative drum, which receives the hose relatively to the supporting-truck—*i. e.*, arranging the longitudinal axis of the drum longitudinally of the truck, so that when the latter is stood upon one end the reel-drum will be vertical—and partly by constructing the truck whereby it may be horizontal when the hose is being wound on the drum and then stand firmly on one end during the draining of the hose.

In order that my invention may be clearly understood, I will proceed to describe the same in detail.

My improved hose-reel comprises a supporting-truck 1 and a reel shaft or drum 2, rotatably mounted upon the truck, for which purpose the latter is provided upon the transverse bars or portions 3 with suitable bearings adapted to receive journals 4 on the reel-drum.

It is essential to the fulfillment of the primary object of my invention that the drum extend longitudinally of the truck, since were said drum to extend transversely of said truck it would still be in a horizontal position when the truck stands on its end, and thus fail to accomplish the draining of the hose.

The drum is provided with suitable clips 5 to receive the opposite ends of the hose and securely hold them in position during the draining of the hose, and one of the journals is provided with a crank 6, whereby the drum may be readily turned to effect the winding up of the hose. A ratchet 7 and pawl 8 are provided to prevent backward rotation of the drum.

In order that the truck may be conveniently moved from place to place, and also adapted to be firmly supported either in a horizontal or a vertical position, as may be desired, I construct the same in the following manner.

The side rails 9 are extended at one end to form handles 10, while the opposite ends of said rails are also extended and preferably curved upwardly, as shown, for a purpose presently apparent.

11 indicates legs, which are bolted to the side rails and having their opposite ends curved downwardly, and in one end of the legs is journaled a shaft 12, carrying rollers 13.

By curving the rails 9 upwardly, as above set forth, the ends are carried farther away from the rollers 13, whereby a broader and firmer bearing is obtained upon the ground when the device is stood upon its end, as seen in Fig. 2. The curved portions of the rails should be extended sufficiently to bring the extreme or bearing ends in a vertical plane with the faces of the rollers, whereby when the device is standing on end—i. e., with the ends of the rails and the rollers in contact with the ground—the reel will be in a vertical position, as seen in Fig. 2. This is an important feature, since a vertical position is the most advantageous one for the thorough draining of the hose.

The rear curved portions of the legs terminate in the same horizontal plane with the lower faces of the rollers to thus support the reel in a horizontal position, which is the proper and most convenient position for the winding of the hose, as seen in Fig. 1.

It will be seen that while the device occupies the horizontal position seen in Fig. 1 the hose may be readily wound upon the drum, and when raised so as to stand upon one end, as seen in Fig. 2, the coils of the hose will be in an approximately horizontal position, whereby the water may thoroughly drain therefrom.

What I claim, and desire to secure by Letters Patent, is—

1. A hose reel comprising a supporting truck, rollers at one end thereof, extended portions adapted in conjunction with said rollers to support the truck upon end in a vertical position, and a drum rotatably mounted on the truck and arranged longitudinally of the latter, whereby the drum may occupy a vertical position corresponding to that of the truck when the latter is standing upon one end, in the manner and for the purpose specified.

2. A hose reel comprising a truck, legs carried by the truck, rollers mounted on a shaft journaled in one end of the legs, the side rails extended at one end and curved upwardly to form in conjunction with the rollers a firm bearing for the truck when the latter is in a vertical position, a drum rotatably mounted in bearings on the truck and arranged longitudinally of the latter, and an operating crank for the drum, all as and for the purpose specified.

In testimony whereof I affix my signature in presence of two witnesses.

DAVID C. LANDON.

Witnesses:
JAMES PLAISTER,
ALEXANDER SIMPLOT.